United States Patent
Rasras et al.

(10) Patent No.: US 8,032,023 B2
(45) Date of Patent: Oct. 4, 2011

(54) RECONFIGURABLE DWDM WAVELENGTH SWITCH BASED ON COMPLEMENTARY BANDPASS FILTERS

(75) Inventors: Mahmoud Rasras, Berkeley Heights, NJ (US); Kun-Yii Tu, Callfon, NJ (US)

(73) Assignee: Alcatel Lucent, Paris (FR)

( * ) Notice: Subject to any disclaimer, the term of this patent is extended or adjusted under 35 U.S.C. 154(b) by 503 days.

(21) Appl. No.: 12/266,905

(22) Filed: Nov. 7, 2008

(65) Prior Publication Data

US 2010/0119226 A1 May 13, 2010

(51) Int. Cl.
*H04J 14/00* (2006.01)
*H04J 14/02* (2006.01)

(52) U.S. Cl. ............ 398/45; 398/43; 398/48; 398/83

(58) Field of Classification Search .......... 398/1, 9, 398/43, 45, 48, 49, 59, 65, 67, 77, 83, 85, 398/183, 193; 385/10–14, 24, 37; 359/326, 359/341.2, 341.33
See application file for complete search history.

(56) References Cited

U.S. PATENT DOCUMENTS

| | | | |
|---|---|---|---|
| 6,005,697 A * | 12/1999 | Wu et al. | 398/48 |
| 6,175,432 B1 * | 1/2001 | Wu et al. | 398/65 |
| 6,496,289 B1 * | 12/2002 | Kuroyanagi et al. | 398/49 |
| 6,545,783 B1 * | 4/2003 | Wu et al. | 398/83 |
| 6,580,534 B2 | 6/2003 | Madsen | |
| 6,751,367 B2 * | 6/2004 | Moslehi et al. | 385/13 |
| 6,947,670 B1 * | 9/2005 | Korotky et al. | 398/59 |
| 7,555,216 B2 * | 6/2009 | Yoshino et al. | 398/77 |

* cited by examiner

*Primary Examiner* — Loha Ben
(74) *Attorney, Agent, or Firm* — Brosemer, Kolefas & Assoc.

(57) ABSTRACT

Programmable wavelength line switches and routers based on a complementary wavelength switch (CWS) building block are described for switching optical signals of different wavelengths between signal lines, with each carrying multiple wavelengths. The CWS building block is based on a complementary bandpass filter structure. The reconfigurable wavelength routers described allow any of a plurality of wavelengths on any line to be switched to any output line by programming the filters accordingly. The various implementations described are useful for wavelength division multiplexing (WDM), dense WDM, and ultra dense WDM optical communications systems, as well as for on-chip interconnects and optical signal processing.

13 Claims, 14 Drawing Sheets

RECONFIGURABLE DWDM WAVELENGTH SWITCH BASED ON COMPLEMENTARY BANDPASS FILTERS

FIELD OF THE INVENTION

The present invention relates to the field of optical communications, and more specifically to apparatus and methods related to optical wavelength switching.

BACKGROUND INFORMATION

In Wavelength Division Multiplexing (WDM) optical communications networks, optical signals are transmitted at predetermined wavelengths in which each wavelength forms a communication channel in the network and the wavelength of the optical signal is used to control the destination of the signal through the network. In Dense Wavelength Division Multiplexing (DWDM) networks, the number of wavelength channels is increased by reducing the channel wavelength separation. In a standard DWDM network, the separation between communication channels is 100 GHz, and 50 GHz in more advanced systems.

In WDM and DWDM networks, switches are used to select paths for optical signals through the optical fibers forming the networks, i.e., to direct optical signals from one optical fiber to another and from one wavelength channel to another. Switches tend to be large and complex, interconnecting many inputs and outputs over multiple wavelengths.

One type of switch implementation, such as arrayed waveguide grating (AWG) implementations, entails complicated routing and wavelength sequencing. Moreover, for AWG implementations with large numbers of inputs and outputs, it is not clear that such implementations are truly reconfigurable on any wavelength and between any input and any output.

SUMMARY OF THE INVENTION

In an exemplary embodiment, the present invention provides an optical 2×2 complementary wavelength switch comprising an optical bandpass filter. In operation, the switch can selectively switch optical signals of two different wavelengths at either of two inputs to either of two outputs. The 2×2 complementary wavelength switch of the present invention can be used as a building block for more complex wavelength switches, with larger numbers of inputs and outputs, and/or capable of handling larger numbers of wavelengths. Wavelength overlap is not a concern because the operation of the switch in the frequency domain is complementary.

Moreover, the switch of the present invention enjoys fine wavelength resolution and can be implemented on a single substrate using, for example a complementary metal oxide semiconductor (CMOS) process.

The present invention has wide applicability, including, for example in Wavelength Division Multiplexing (WDM), dense WDM and ultra dense WDM switching applications.

The aforementioned and other features and aspects of the present invention are described in greater detail below.

DETAILED DESCRIPTION

Figure 1:
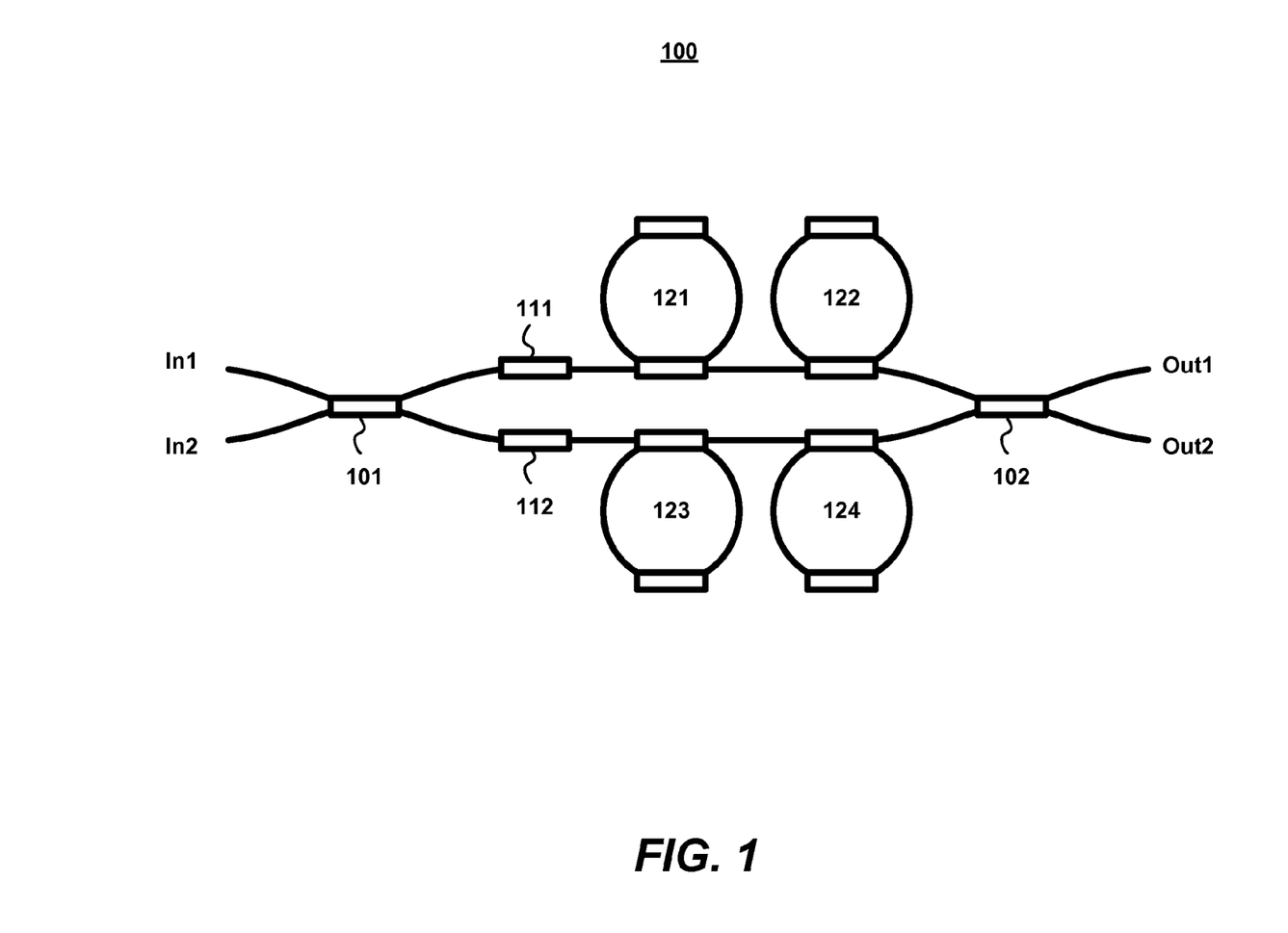
FIG. 1 is a schematic representation of an exemplary embodiment of a two-by-two complementary wavelength switch (CWS) in accordance with the present invention.

FIG. 1 is a schematic representation of an exemplary embodiment of a two-input, two-output or "2×2" complementary wavelength switch (CWS) 100 in accordance with the present invention. The CWS 100 comprises a complementary optical bandpass filter structure comprising a first coupler 101 with input arms receiving the inputs of the CWS 100, In1 and In2. The first coupler 101 has a first output arm connected to a first series arrangement including a phase shifter 111, a ring resonator 121, and a ring resonator 122, and a second output arm connected to a second series arrangement including a phase shifter 112, a ring resonator 123, and a ring resonator 124. The two series arrangements are connected to respective input arms of a second coupler 102 with output arms providing the outputs of the CWS 100, Out1 and Out2.

The ring resonators 121-124 can be implemented in a conventional manner, each with a thermally controlled phase shifter and a thermally controlled coupler, allowing the CWS 100 to be controlled to provide various switching configurations, as described below. Tuning the resonance frequencies of the ring resonators 121-124 will alter the phase therethrough which can be compensated for using the phase shifters 111 and 112 to equalize the total phase through the two arms of the filter structure.

It should be noted that while a four-ring filter structure is used in the exemplary embodiment shown, other filter configurations can be used depending on the desired filter characteristics to be achieved. For example, the four-ring structure produces a four-pole filter and can provide, for example, at most 1 dB loss at the center of the passband and at least 30 dB suppression with 50 GHz wavelength channel spacing. If, however, the two wavelengths are spaced further apart and the filter characteristics need not be as sharp, then a configuration with one ring resonator in each arm may be satisfactory.

Conversely, for sharper cut-offs with closer separation of wavelengths, a configuration with six or more rings may be needed to achieve the desired filter characteristic.

Figure 2A:
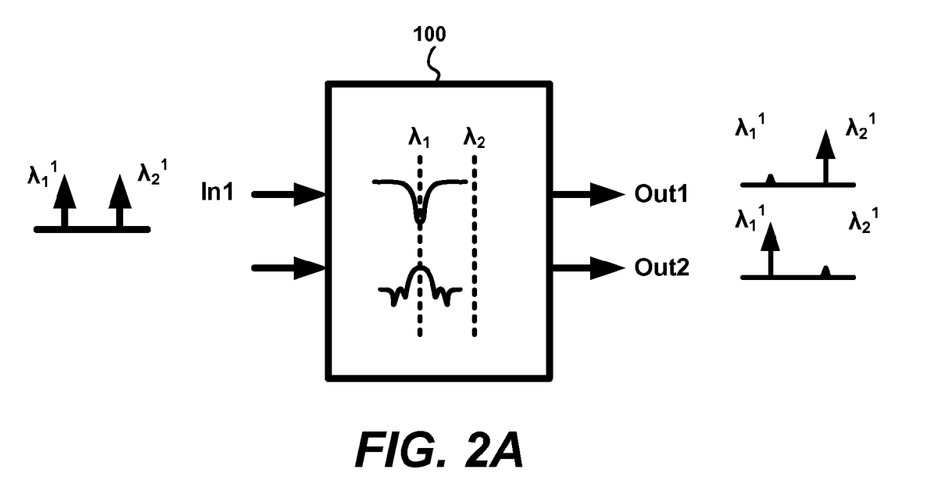
FIGS. 2A and 2B illustrate a first switching configuration of the CWS of FIG. 1.
Figure 2B:
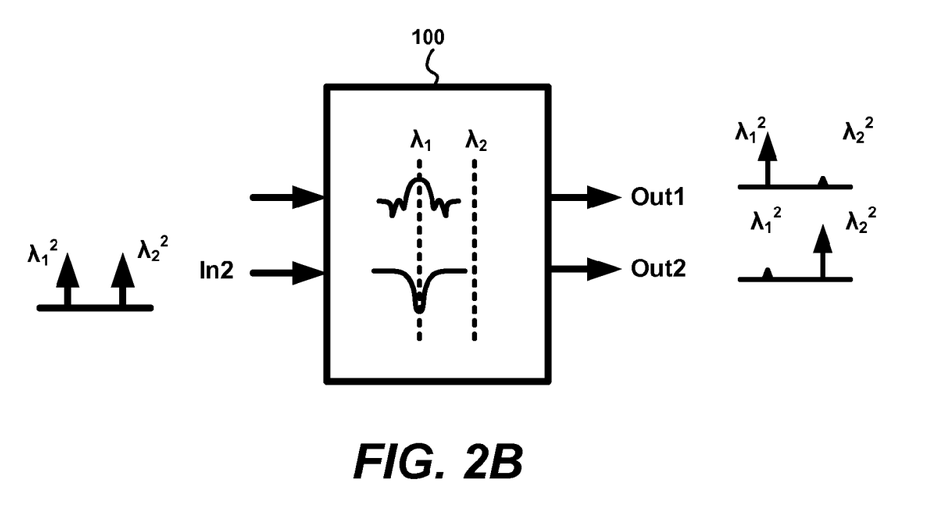

The 2×2 CWS 100 can be controlled to provide any one of four switching configurations for two different wavelengths, $\lambda_1$ and $\lambda_2$, at its two inputs, In1 and In2, to its two outputs, Out1 and Out2. FIGS. 2A and 2B illustrate a first such configuration in which the bandpass filter structure of CWS 100 is tuned to $\lambda_1$. As shown in FIG. 2A, optical signals of wavelengths $\lambda_1$ and $\lambda_2$ applied at In1, will be subjected to the filter characteristics shown so that the signal of wavelength $\lambda_1$ will be output at Out2, and the signal of wavelength $\lambda_2$ will be output at Out1. Conversely, the signal of wavelength $\lambda_1$ will be suppressed at Out1, and the signal of wavelength $\lambda_2$ will be suppressed at Out2 for optical signals of wavelengths $\lambda_1$ and $\lambda_2$ applied at In1. As shown in FIG. 2B, optical signals of wavelengths $\lambda_1$ and $\lambda_2$ applied at In2, will be subjected to the filter characteristics shown so that the signal of wavelength $\lambda_1$ will be output at Out1, and the signal of wavelength $\lambda_2$ will be output at Out2. Conversely, the signal of wavelength $\lambda_1$ will be suppressed at Out2, and the signal of wavelength $\lambda_2$ will be suppressed at Out1 for optical signals of wavelengths $\lambda_1$ and $\lambda_2$ applied at In2. As such, the configuration of FIGS. 2A and 2B provides cross-over routing of wavelength $\lambda_1$ from In1 to Out2 and In2 to Out1, and pass-through routing of wavelength $\lambda_2$ from In1 to Out1 and In2 to Out2.

Figure 3A:
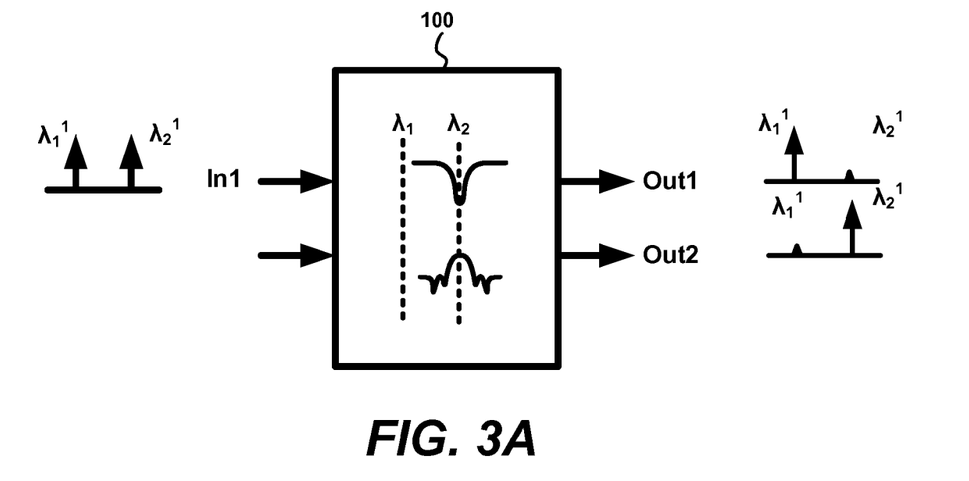
FIGS. 3A and 3B illustrate a second switching configuration of the CWS of FIG. 1.
Figure 3B:
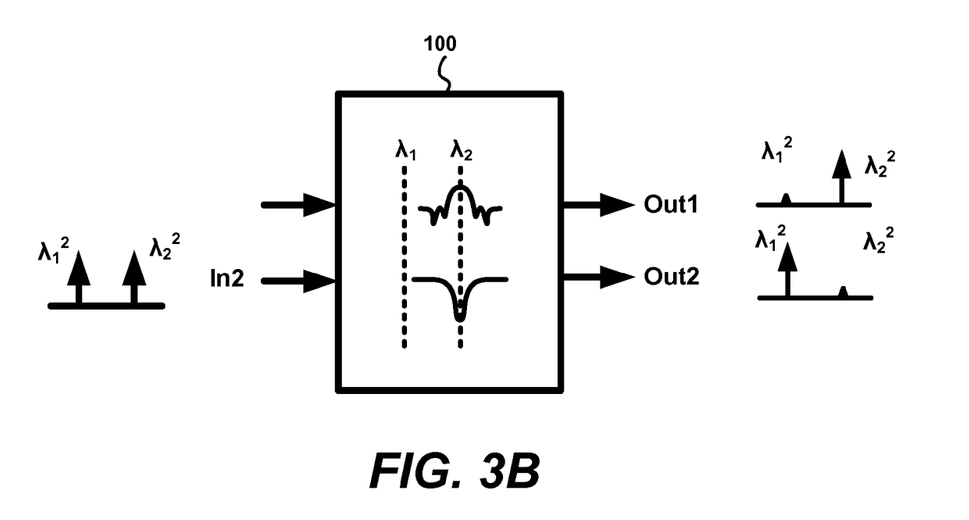

FIGS. 3A and 3B illustrate a second switching configuration in which the bandpass filter structure of CWS 100 is tuned to $\lambda_2$. As shown in FIG. 3A, optical signals of wavelengths $\lambda_1$ and $\lambda_2$ applied at In1, will be subjected to the filter characteristics shown so that the signal of wavelength $\lambda_1$ will be output at Out1, and the signal of wavelength $\lambda_2$ will be output at Out2. Conversely, the signal of wavelength $\lambda_1$ will be suppressed at Out2, and the signal of wavelength $\lambda_2$ will be suppressed at Out1 for optical signals of wavelengths $\lambda_1$ and $\lambda_2$ applied at In1. As shown in FIG. 3B, optical signals of wavelengths $\lambda_1$ and $\lambda_2$ applied at In2, will be subjected to the filter characteristics shown so that the signal of wavelength $\lambda_1$ will be output at Out2, and the signal of wavelength $\lambda_2$ will be output at Out1. Conversely, the signal of wavelength $\lambda_1$ will be suppressed at Out1, and the signal of wavelength $\lambda_2$ will be suppressed at Out2 for optical signals of wavelengths $\lambda_1$ and $\lambda_2$ applied at In2. As such, the configuration of FIGS. 3A and 3B provides pass-through routing of wavelength $\lambda_1$ from In1 to Out1 and In2 to Out2 and cross-over routing of wavelength $\lambda_2$ from In1 to Out2 and In2 to Out1.

Figure 4A:
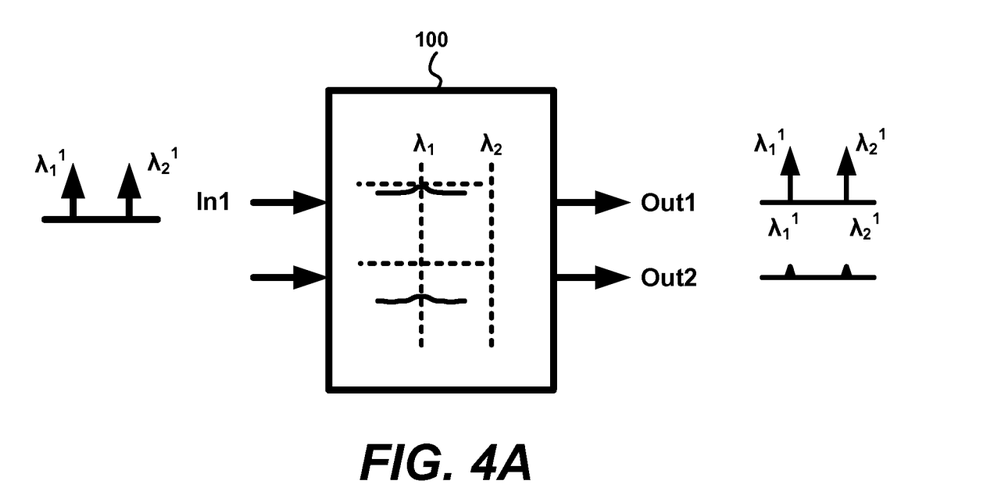
FIGS. 4A and 4B illustrate a third switching configuration of the CWS of FIG. 1.
Figure 4B:
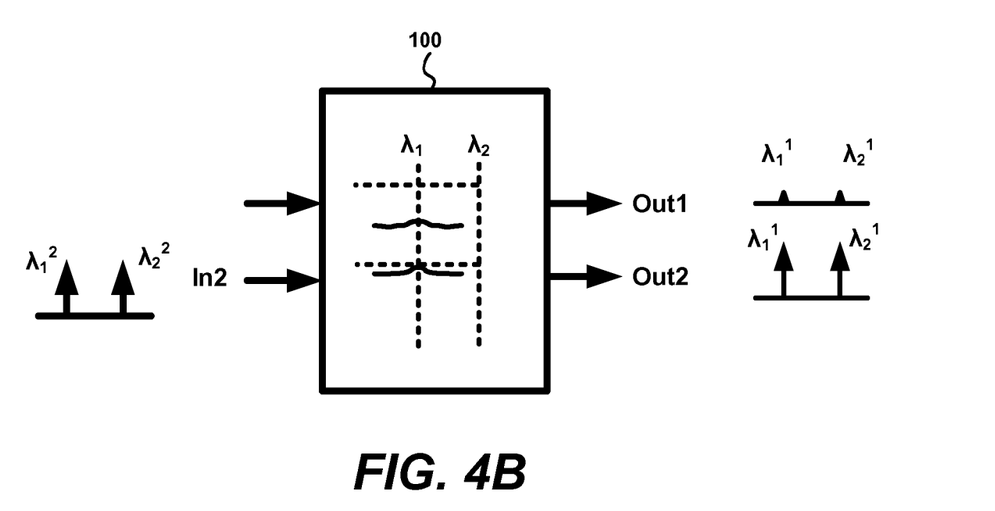

FIGS. 4A and 4B illustrate a third switching configuration in which the tuning and coupling of the bandpass filter structure of CWS 100 are turned off. As shown in FIG. 4A, optical signals of wavelengths $\lambda_1$ and $\lambda_2$ applied at In1, will be subjected to the filter characteristics shown so that the signal of wavelength $\lambda_1$ will be output at Out1, and the signal of wavelength $\lambda_2$ will be output at Out1. Conversely, the signal of wavelength $\lambda_1$ will be suppressed at Out2, and the signal of wavelength $\lambda_2$ will be suppressed at Out2 for optical signals of wavelengths $\lambda_1$ and $\lambda_2$ applied at In1. As shown in FIG. 4B, optical signals of wavelengths $\lambda_1$ and $\lambda_2$ applied at In2, will be subjected to the filter characteristics shown so that the signal of wavelength $\lambda_1$ will be suppressed at Out1, and the signal of wavelength $\lambda_2$ will be suppressed at Out1. Conversely, the signal of wavelength $\lambda_1$ will be output at Out2, and the signal of wavelength $\lambda_2$ will be output at Out2 for optical signals of wavelengths $\lambda_1$ and $\lambda_2$ applied at In2. As such, the configuration of FIGS. 4A and 4B provides pass-through routing of both wavelengths from In1 to Out1 and In2 to Out2.

Figure 5A:
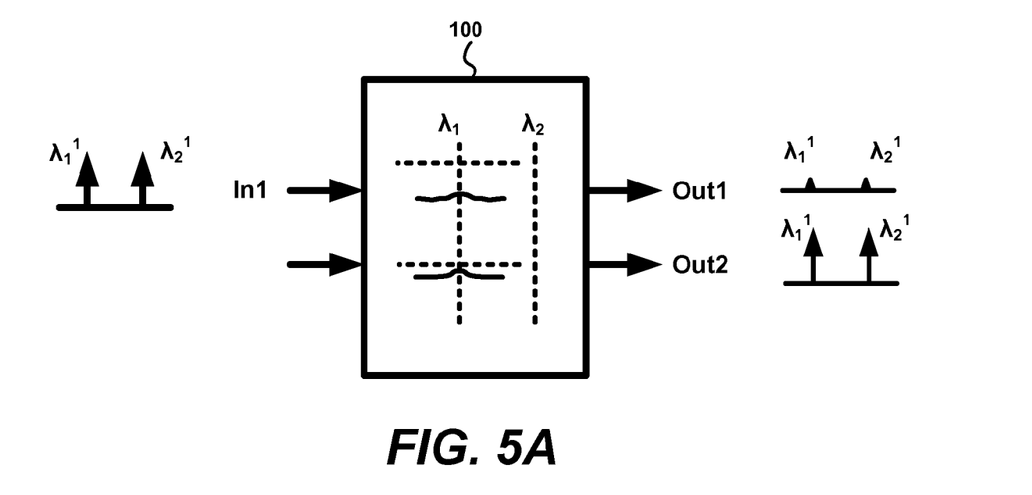
FIGS. 5A and 5B illustrate a fourth switching configuration of the CWS of FIG. 1.
Figure 5B:
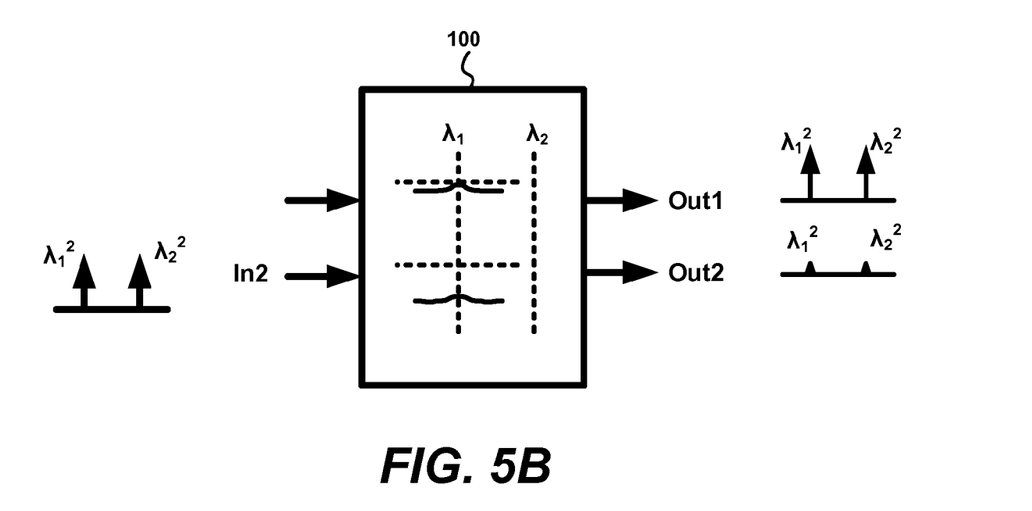

FIGS. 5A and 5B illustrate a fourth switching configuration in which the tuning and one of the two couplers (101, 102) of the bandpass filter structure of CWS 100 are turned off, while the other of the two couplers (101, 102) provides full coupling. As shown in FIG. 5A, optical signals of wavelengths $\lambda_1$ and $\lambda_2$ applied at In1, will be subjected to the filter characteristics shown so that the signal of wavelength $\lambda_1$ will be output at Out2, and the signal of wavelength $\lambda_2$ will be output at Out2. Conversely, the signal of wavelength $\lambda_1$ will be suppressed at Out1, and the signal of wavelength $\lambda_2$ will be suppressed at Out1 for optical signals of wavelengths $\lambda_1$ and $\lambda_2$ applied at In1. As shown in FIG. 5B, optical signals of wavelengths $\lambda_1$ and $\lambda_2$ applied at In2, will be subjected to the filter characteristics shown so that the signal of wavelength $\lambda_1$ will be output at Out1, and the signal of wavelength $\lambda_2$ will be output at Out1. Conversely, the signal of wavelength $\lambda_1$ will be suppressed at Out2, and the signal of wavelength $\lambda_2$ will be suppressed at Out2 for optical signals of wavelengths $\lambda_1$ and $\lambda_2$ applied at In2. As such, the configuration of FIGS. 5A and 5B provides cross-over routing of both wavelengths from In1 to Out2 and In2 to Out1.

Note that each pair of figures described above (i.e., FIGS. 2A and B, 3A and B, 4A and B, and 5A and B) pertain to the same filter configuration. Two figures are used for each configuration to illustrate the two different (but complementary) filter characteristics between each of the two inputs and the two outputs.

As can be seen from the various configurations described above, the exemplary CWS 100 of the present invention allows two identical sets of wavelengths from two input ports to be selected with arbitrary combinations for routing to two output ports without overlapping or interference. Note that in each configuration, the filter characteristics at the inputs are complementary. In other words, the filter characteristic to which a signal applied at In1 is subjected is complementary to that to which a signal applied at In2 is subjected.

Figure 6:
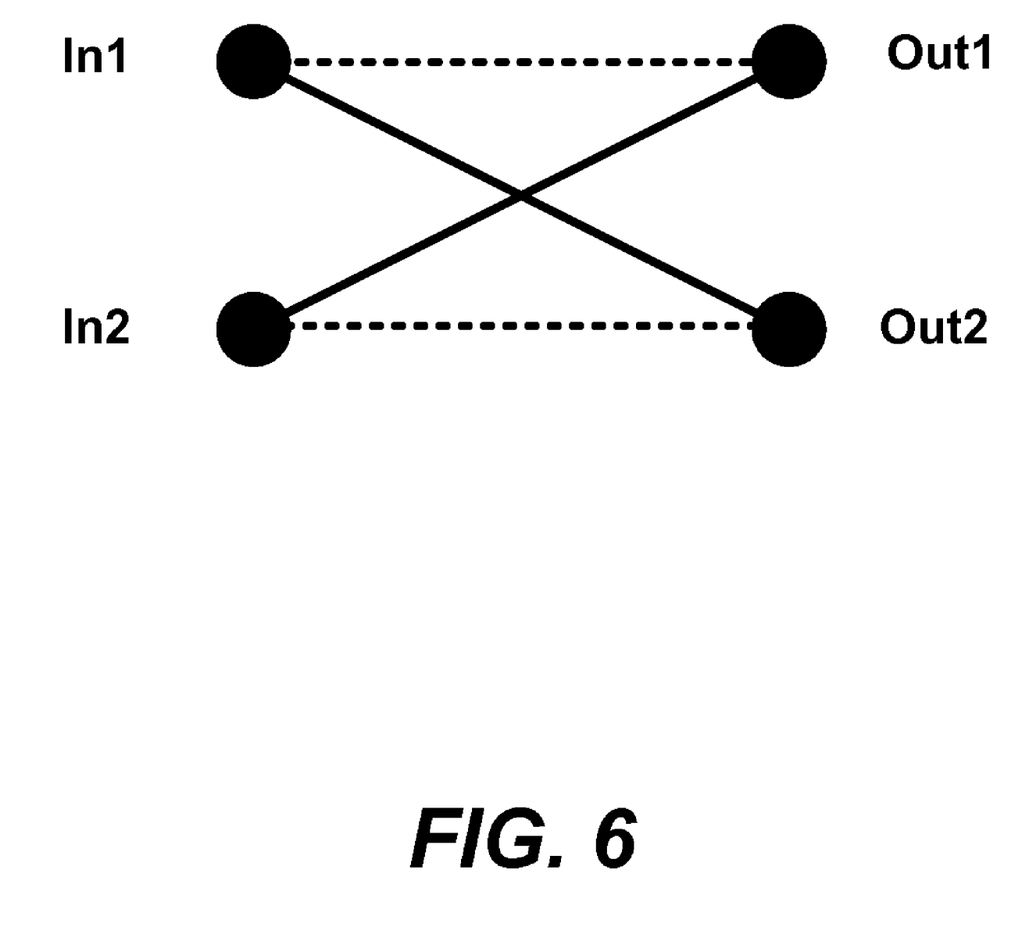
FIG. 6 is a schematic representation summarizing the possible switching configurations of the 2×2 CWS of FIG. 1.

The various configurations of the CWS 100 described above are summarized schematically in FIG. 6. As depicted in FIG. 6, the CWS 100 can be configured so that signals of either wavelength $\lambda_1$ or $\lambda_2$ applied at either input, In1 and In2, can be switched to either output, Out1 and Out2, independently. As shown in FIG. 6, the solid lines represent cross-over switching from In1 to Out2 or In2 to Out1 and the dotted lines represent straight-through routing from In1 to Out1 or In2 to Out2.

Figure 7A:
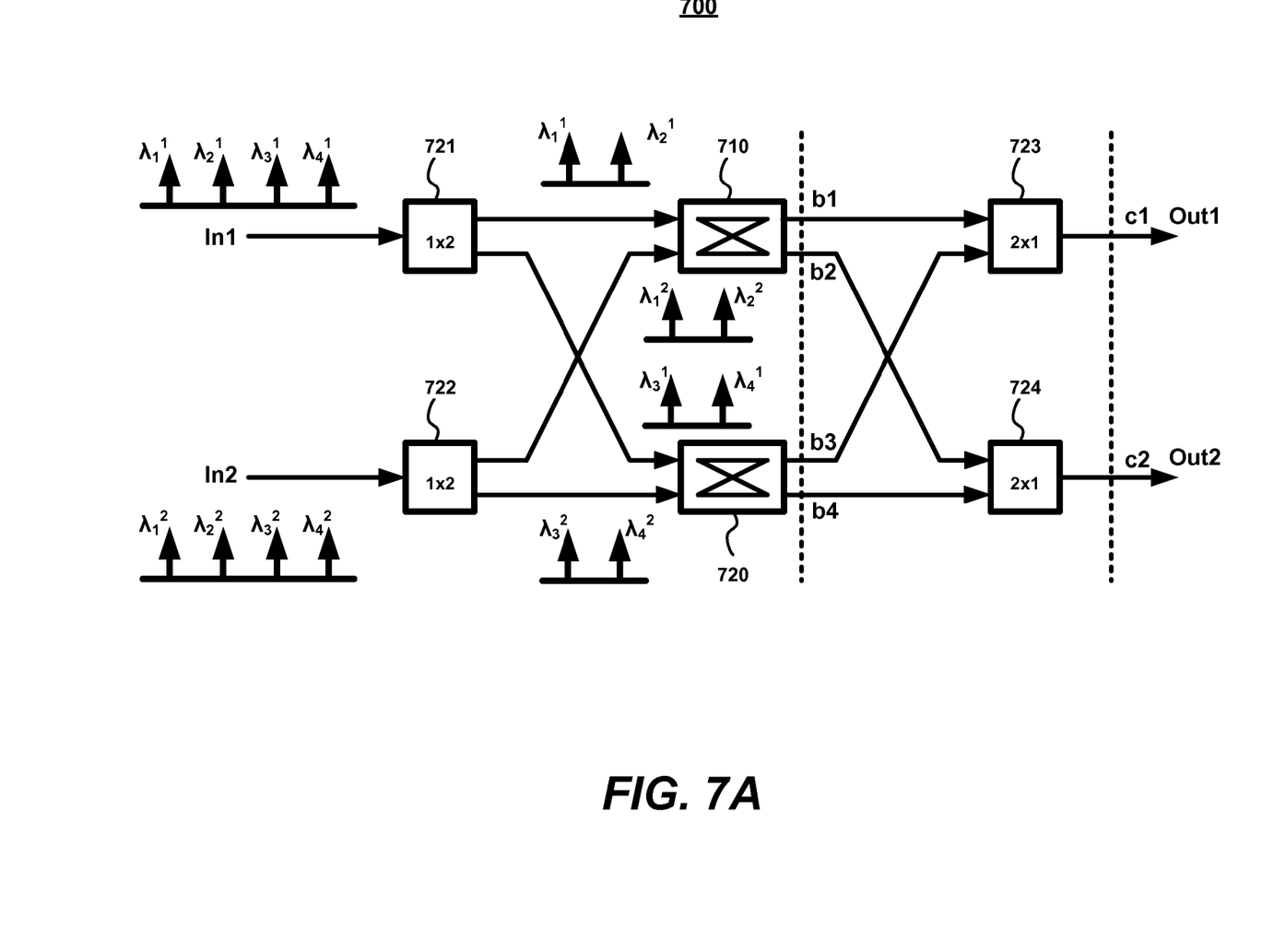
FIG. 7A is a schematic representation of an exemplary embodiment of a 2×2 wavelength switch for handling four wavelengths.
Figure 7B:
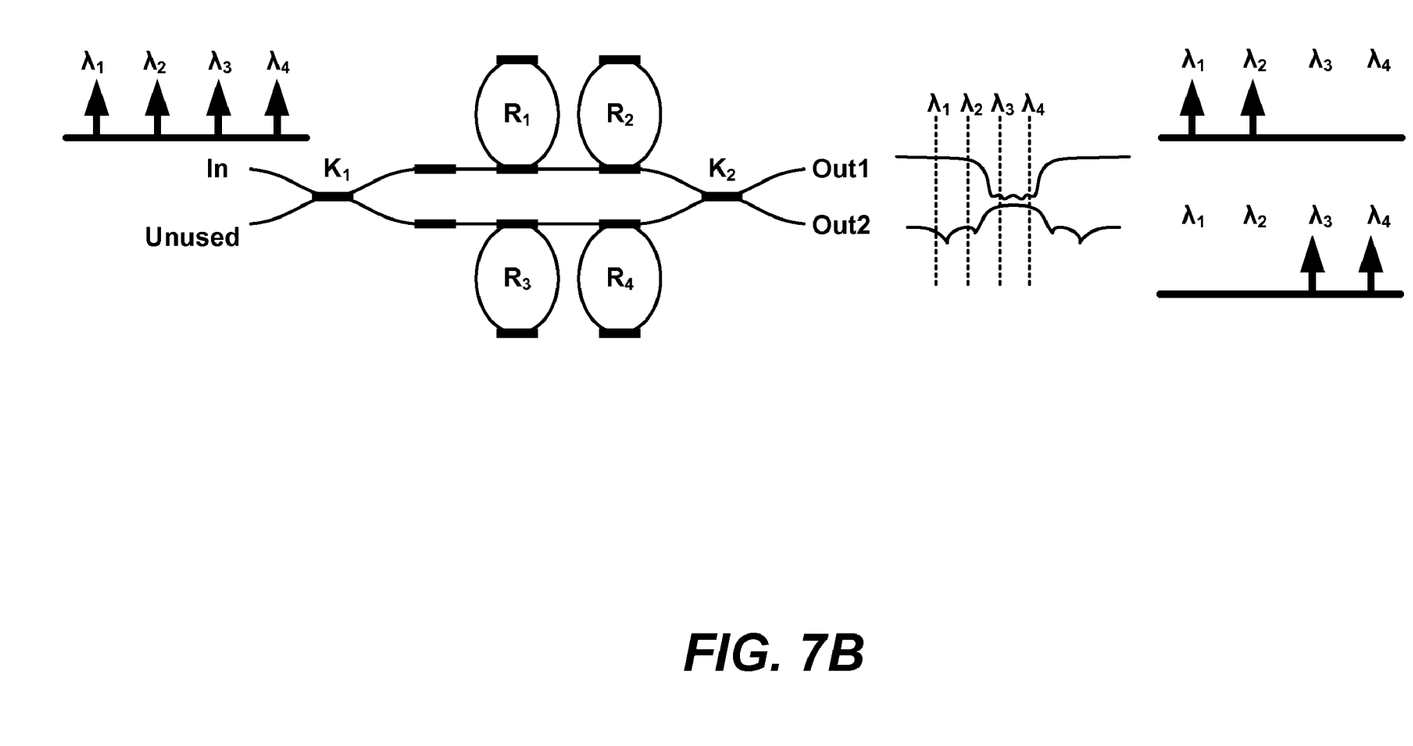
FIG. 7B is a schematic representation of a four-wavelength configurable switch for use in the 2×2 four-wavelength switch of FIG. 7A as a 1×2 splitter.
Figure 7C:
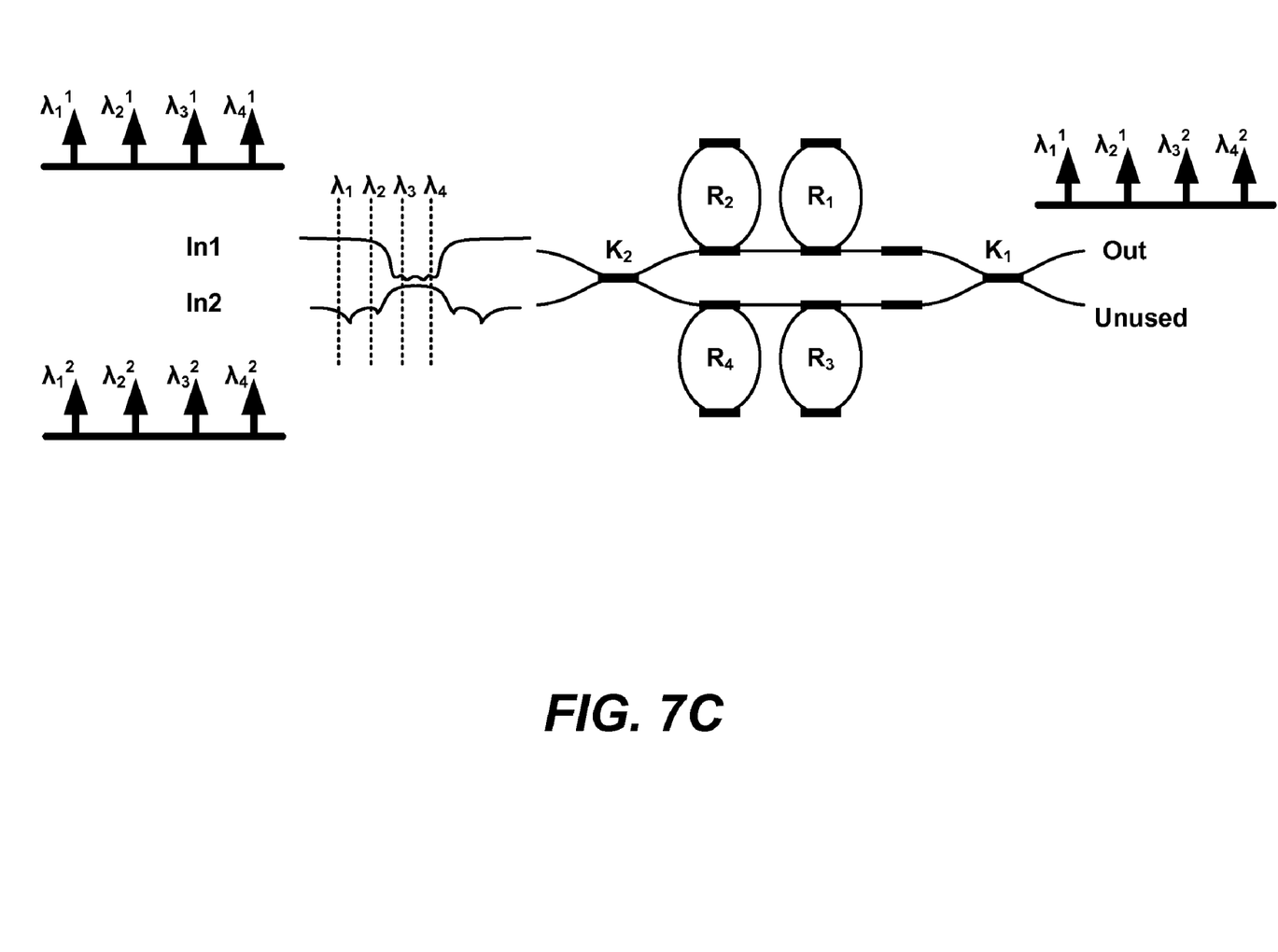
FIG. 7C is a schematic representation of a four-wavelength configurable switch for use in the 2×2 four-wavelength switch of FIG. 7A as a 2×1 combiner.

The CWS 100 can be used as a unit cell or building block to form more complex switching structures. For example, as shown in FIG. 7A, an exemplary embodiment of a 2×2 four-wavelength switch 700 for switching four wavelengths between two inputs (In1, In2) and two outputs (Out1, Out2) can be implemented using 2×2 CWSs 710 and 720, implemented as described above. The four-wavelength switch 700 also comprises two four-wavelength 1×2 splitters 721 and 722, and two four-wavelength 2×1 combiners 723 and 724. Each of the 1×2 splitters 721 and 722 can be implemented with a complementary bandpass filter structure such as that shown in FIG. 7B. The complementary bandpass filter structure of FIG. 7B is similar to that shown in FIG. 1 but tuned to handle four wavelengths. The 2×1 combiners 723 and 724 can be implemented using the complementary bandpass filter structure of FIG. 7C. Note that the combiner structure of FIG. 7C can be implemented as a mirror image of the splitter structure of FIG. 7B.

Figure 7D:
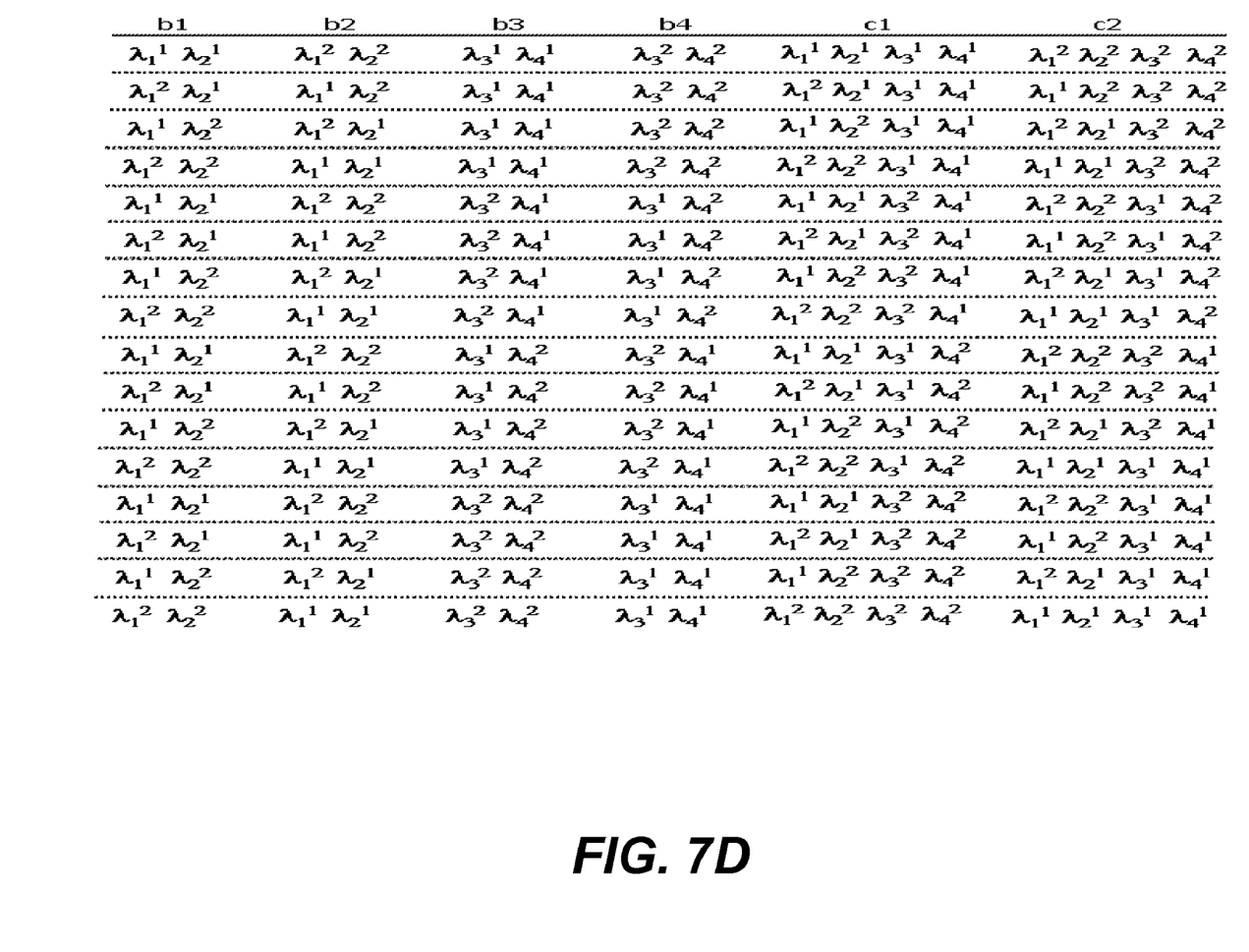
FIG. 7D is a table listing the combinations of wavelengths at crossing points of the 2×2 four-wavelength switch of FIG. 7A.

FIG. 7D shows a table listing the combinations of wavelengths at crossing points $b_1$, $b_2$, $b_3$, $b_4$, $c_1$, and $c_2$, of the switch 700 of FIG. 7A. The 2×2 four-wavelength switch 700 is able to select any combination of four identical wavelength signals from two lines without causing interference. In other words, the switch 700 will not allow signals of the same wavelength from different inputs to go to the same output.

Even more complex wavelength switching structures can be readily implemented by scaling-up the exemplary arrangement of FIG. 7A with 2×2 CWSs as building blocks, in accordance with the present invention. For example, a 2×2 switch that can handle eight wavelengths can be implemented using two one-to-four splitters, four 2×2 complementary wavelength switches and two four-to-one combiners, etc. The one-to-four wavelength splitters and four-to-one combiners can be implemented with a complementary bandpass filter structure, similar to that shown in FIG. 7B, but tuned accordingly to accommodate the additional wavelengths. In this fashion, 2×2 wavelength switches with two inputs and two outputs handling 2, 4, 8, 16, . . . , $2^n$ wavelengths can be implemented.

Figure 8:
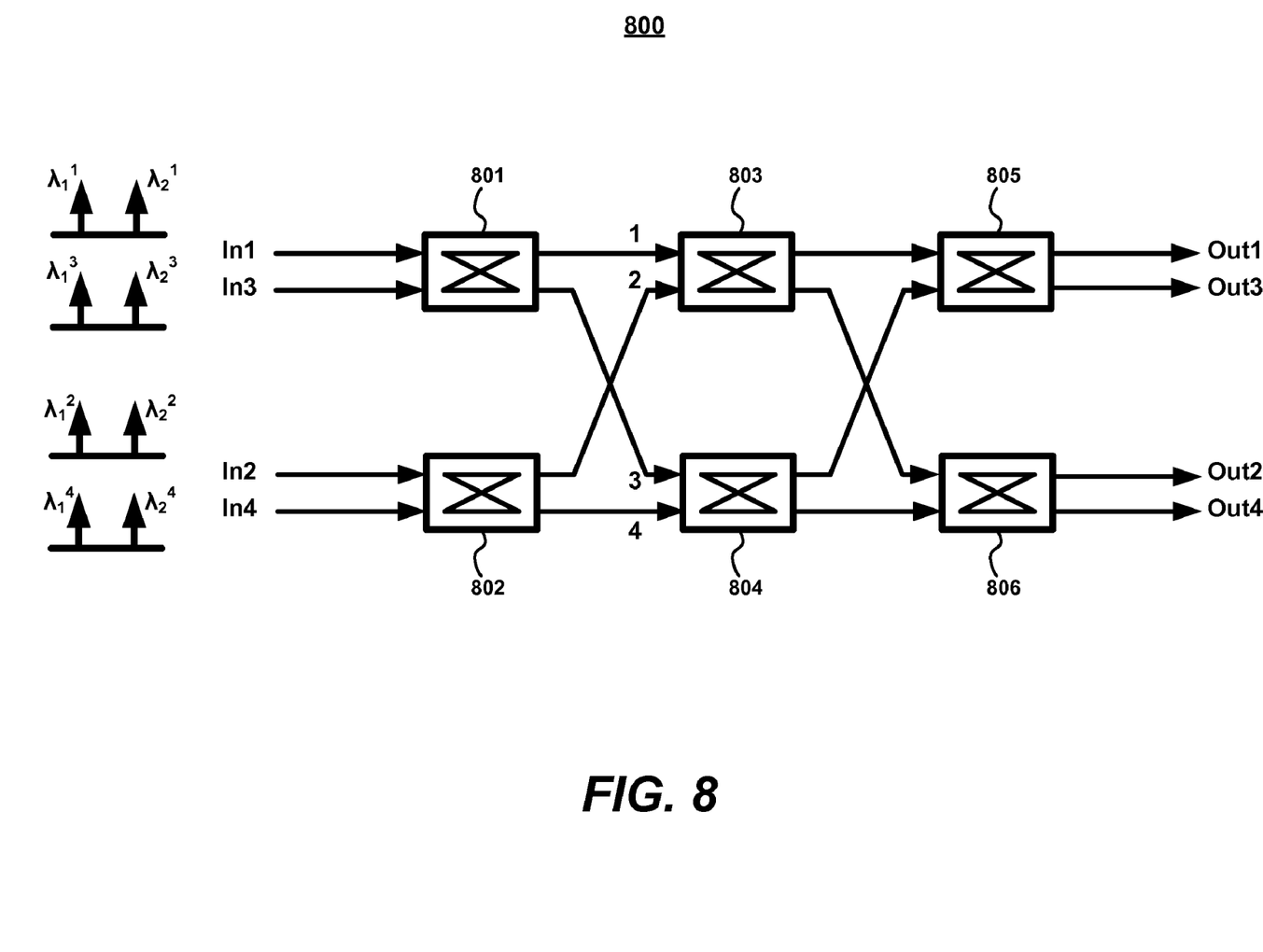
FIG. 8 is a schematic representation of an exemplary embodiment of a 4×4 wavelength router comprising multiple 2×2 CWSs.

In addition to implementing 2×2 switches of greater wavelength handling complexity, the 2×2 CWS building block of the present invention can be used to implement more complex switching and routing systems with more inputs and outputs. For example, FIG. 8 shows a schematic representation of an exemplary embodiment of a 4×4, two-wavelength router 800 comprising multiple 2×2 CWSs 801-806. Each of the CWSs 801-806 can be implemented as shown in FIG. 1.

Note that for 4×4 implementations handling four wavelengths, each of the 2×2 two-wavelength CWSs 801-806 can be replaced by a four-wavelength 2×2 switch such as that shown in FIG. 7A. In similar fashion, routers of greater wavelength handling ability can be implemented with 2×2 switches of commensurate wavelength handling ability. As described above, each of the 2×2 CWS can be designed to handle 2, 4, 8, . . . , $2^n$ numbers of wavelengths.

Figure 9:
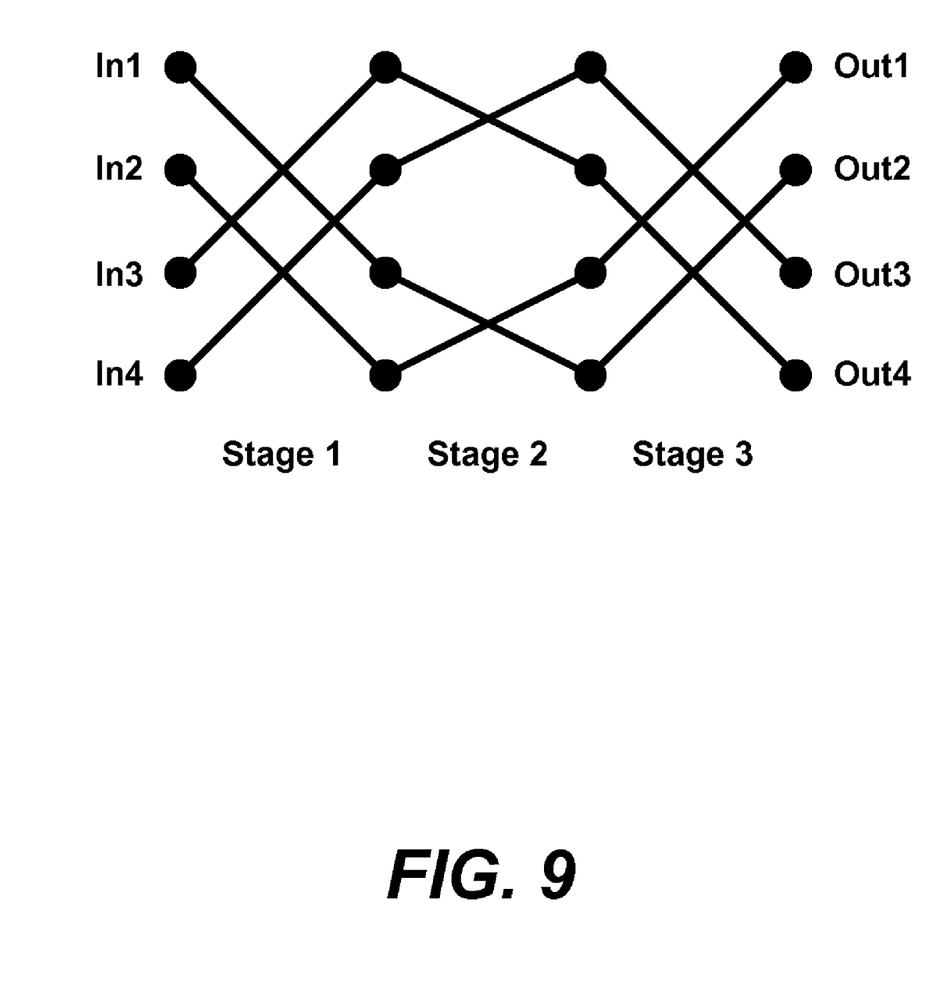
FIG. 9 is an exemplary butterfly interconnect diagram illustrating one of a plurality of switching configurations of the 4×4 wavelength router of FIG. 8.

FIG. 9 is an exemplary 4×4 butterfly interconnect diagram applicable to the 4×4 wavelength router of FIG. 8.

Figure 10:
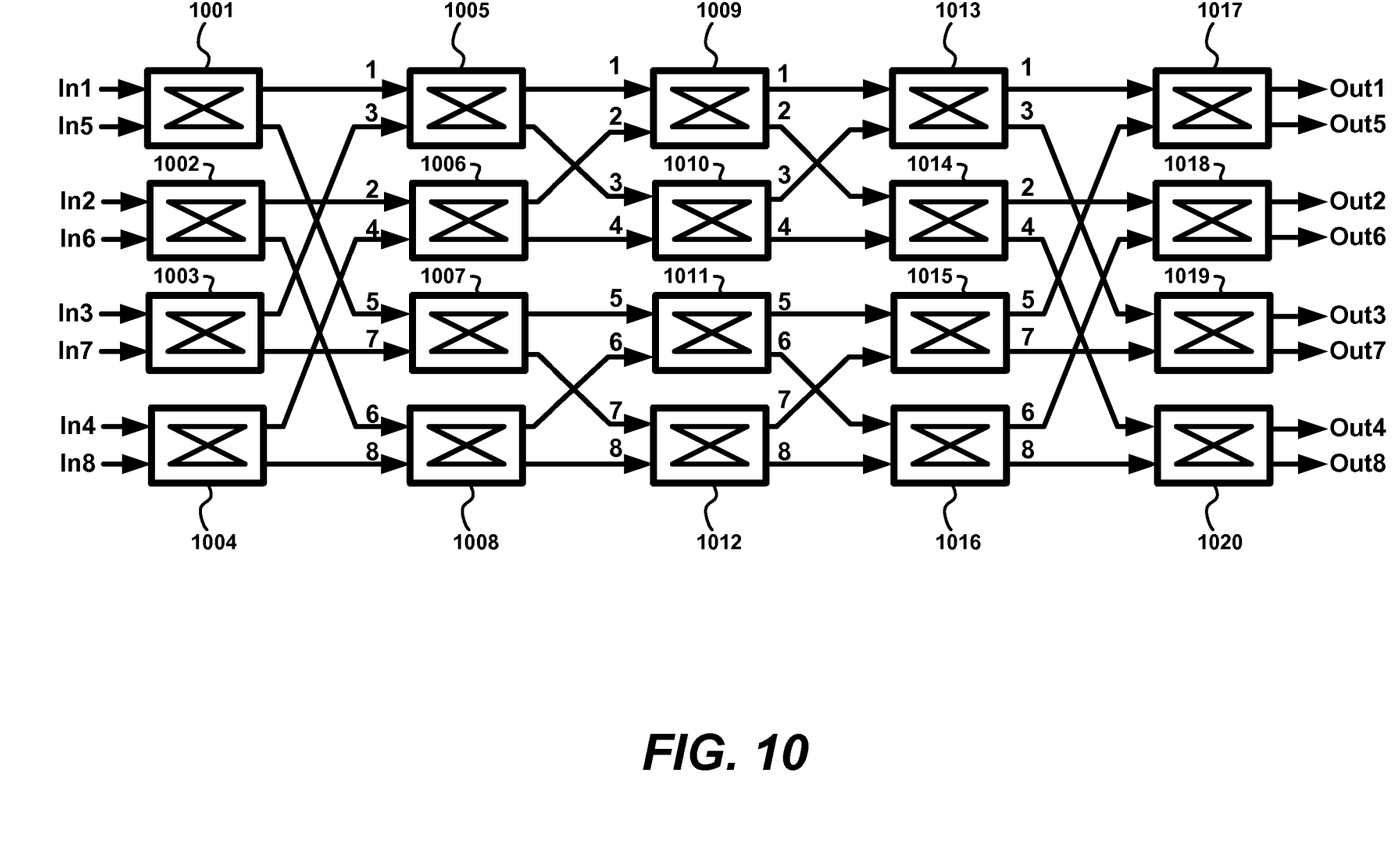
FIG. 10 is a schematic representation of an exemplary embodiment of an 8×8 wavelength router comprising multiple 2×2 CWSs.

FIG. 10 shows a schematic representation of an exemplary embodiment of an 8×8 router 1000 comprising multiple 2×2 CWSs 1001-1020. Each of the CWSs 1001-1020 can be implemented as shown in FIG. 1, for a two-wavelength implementation, or can be scaled-up to handle 2, 4, 8, . . . , $2^n$ numbers of wavelengths, as described above.

Figure 11:
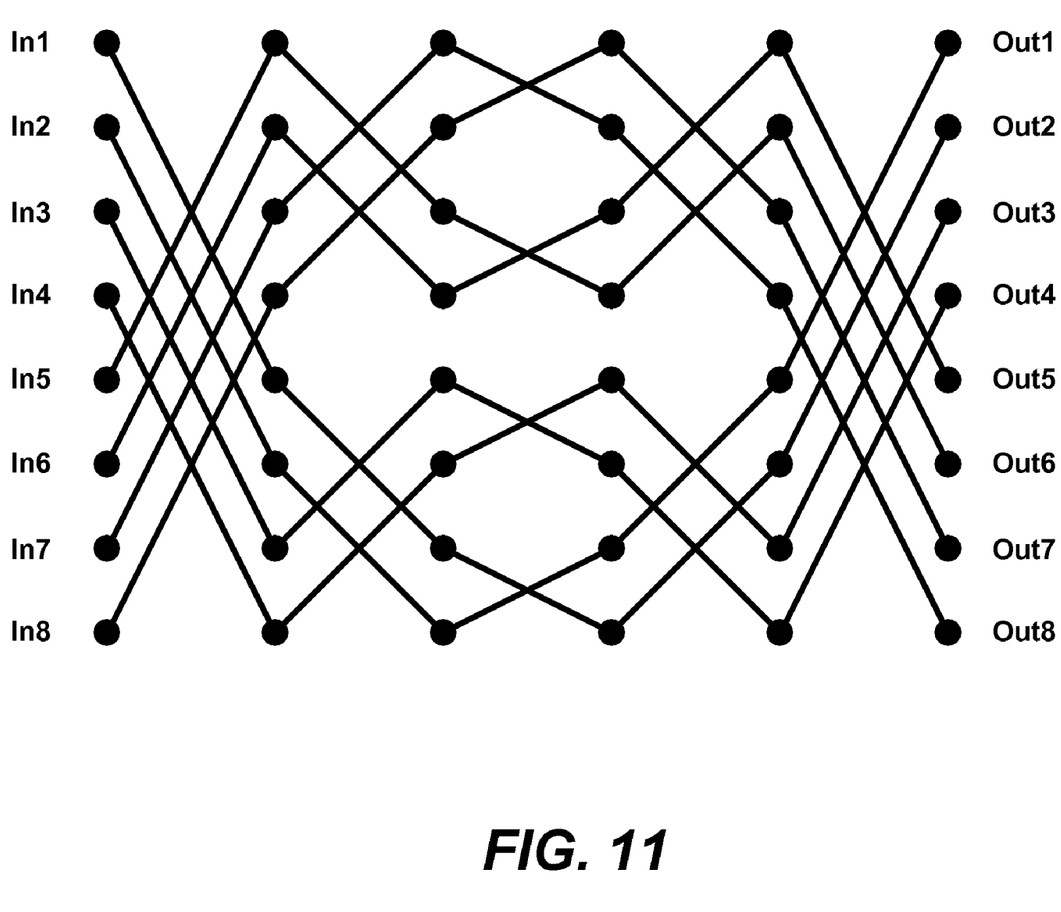
FIG. 11 is an exemplary butterfly interconnect diagram illustrating one of a plurality of switching configurations of the 8×8 wavelength router of FIG. 10.

FIG. 11 is an exemplary 8×8 butterfly interconnect diagram applicable to the 8×8 wavelength router of FIG. 10. The wavelength routings that prevent congestion (i.e. same wavelengths at different inputs connecting to the same output) are controlled like a conventional butterfly interconnect and applied on each of the wavelengths. Thus, each wavelength can be switched on its own following its own butterfly interconnecting rules. Systems with larger numbers of inputs and outputs can be expanded accordingly. The present invention thus provides a switching building block and associated architecture that is readily scalable.

Router implementations in accordance with the present invention can be particularly useful in integrated platforms. Moreover, such routers can be implemented with minimal waveguide crossings as compared to conventional approaches which use wavelength splitters for each input and which route the outputs with the same wavelength from the splitters to a dedicated switch for each wavelength and then decide to which output port each wavelength should go. With such conventional implementations, the number of waveguide crossings grows tremendously as the number of input and output ports increases.

It is understood that the above-described embodiments are illustrative of only a few of the possible specific embodiments which can represent applications of the invention. Numerous and varied other arrangements can be made by those skilled in the art without departing from the spirit and scope of the invention.

What is claimed is:

1. An optical switch comprising a complementary optical bandpass filter structure with first and second inputs and first and second outputs, characterized in that:
   a filter characteristic between the first input and the first output is the same as a filter characteristic between the second input and the second output;
   a filter characteristic between the first input and the second output is the same as a filter characteristic between second input and the first output; and
   the filter characteristic between the first input and the first output and between the second input and the second output is complementary to the filter characteristic between the first input and the second output and between the second input and the first output.

2. The optical switch of claim 1, wherein:
   the filter characteristic between the first input and the first output and between the second input and the second output suppresses signals of a first wavelength and passes signals of a second wavelength, and
   the filter characteristic between the first input and the second output and between the second input and the first output passes signals of the first wavelength and suppresses signals of the second wavelength.

3. The optical switch of claim 1, wherein:
   the filter characteristic between the first input and the first output and between the second input and the second output passes signals of a first wavelength and suppresses signals of a second wavelength, and
   the filter characteristic between the first input and the second output and between the second input and the first output suppresses signals of the first wavelength and passes signals of the second wavelength.

4. The optical switch of claim 1, wherein:
   the filter characteristic between the first input and the first output and between the second input and the second output passes signals of first and second wavelengths, and
   the filter characteristic between the first input and the second output and between the second input and the first output suppresses signals of the first and second wavelengths.

5. The optical switch of claim 1, wherein:
   the filter characteristic between the first input and the first output and between the second input and the second output suppresses signals of first and second wavelengths, and
   the filter characteristic between the first input and the second output and between the second input and the first output passes signals of the first and second wavelengths.

6. The optical switch of claim 1, wherein the filter characteristics are reconfigurable.

7. The optical switch of claim 1, wherein the complementary optical bandpass filter structure has two arms, each arm including a series arrangement with two ring resonators.

8. An M-wavelength optical switch for switching optical signals of M wavelengths between two inputs and two outputs comprising the optical switch of claim 1.

9. An N-by-N optical switch for switching optical signal between N inputs and N outputs comprising the optical switch of claim 1.

10. An M-wavelength N-by-N optical switch for switching optical signals of M wavelengths between N inputs and N outputs comprising the optical switch of claim 1.

11. The optical switch of claim 1, wherein the complementary optical bandpass filter structure comprises:
   a first coupler receiving the first and second inputs;
   a first arm coupled to a first output of the first coupler;
   a second arm coupled to a second output of the first coupler; and
   a second coupler for providing the first and second outputs, the first arm being coupled to a first input of the second coupler and the second arm being coupled to second input of the second coupler,
   wherein each of the first and second arms comprises at least one ring resonator.

12. The optical switch of claim 11, wherein each of the first and second arms comprises a phase shifter in series with the at least one ring resonator.

13. The optical switch of claim 12, wherein the phase shifters and ring resonators are adjustable.

* * * * *